US012633484B2

(12) United States Patent
Reid et al.

(10) Patent No.: US 12,633,484 B2
(45) Date of Patent: May 19, 2026

(54) CIRCUIT BREAKERS

(71) Applicant: Schneider Electric USA, Inc., Andover, MA (US)

(72) Inventors: Paul A. Reid, Cedar Rapids, IA (US); Andi Jakupi, Marion, IA (US)

(73) Assignee: Schneider Electric USA, Inc., Boston, MA (US)

(*) Notice: Subject to any disclaimer, the term of this patent is extended or adjusted under 35 U.S.C. 154(b) by 501 days.

(21) Appl. No.: 18/142,028

(22) Filed: May 2, 2023

(65) Prior Publication Data

US 2024/0222057 A1 Jul. 4, 2024

Related U.S. Application Data

(60) Provisional application No. 63/436,452, filed on Dec. 30, 2022.

(51) Int. Cl.
*H01H 71/04* (2006.01)
*H01H 73/14* (2006.01)

(52) U.S. Cl.
CPC ............ *H01H 71/04* (2013.01); *H01H 73/14* (2013.01); *H01H 2071/042* (2013.01); *H01H 2219/0026* (2013.01)

(58) Field of Classification Search
None
See application file for complete search history.

(56) References Cited

U.S. PATENT DOCUMENTS

| | | | | |
|---|---|---|---|---|
| 8,169,757 | B2 * | 5/2012 | Larson | H01H 71/04 361/42 |
| 2004/0140956 | A1 | 7/2004 | Kushler et al. | |
| 2009/0140871 | A1 | 6/2009 | Titus | |
| 2010/0149711 | A1 | 6/2010 | Larson et al. | |
| 2014/0254052 | A1 | 9/2014 | Carlino et al. | |
| 2018/0217711 | A1 | 8/2018 | Teranishi et al. | |
| 2020/0090881 | A1 | 3/2020 | Fields et al. | |
| 2021/0126447 | A1 | 4/2021 | Miller et al. | |

FOREIGN PATENT DOCUMENTS

JP 2011182532 A 9/2011

OTHER PUBLICATIONS

International Search Report and the Written Opinion for corresponding International Patent Application No. PCT/US2023/084446 dated Apr. 22, 2024, 15 pages.

* cited by examiner

*Primary Examiner* — Farhana A Hoque
(74) *Attorney, Agent, or Firm* — Wolf, Greenfield & Sacks, P.C.

(57) ABSTRACT

A circuit breaker can include a housing configured to fit within a slot of a circuit panel and a display configured to display information. The display can include a touch zone configured to allow touch inputs, and a variable image zone configured to display information and at least partially coincident with the touch zone. The circuit breaker can also include a logic module operatively connected to the touch zone to receive the touch inputs, and operatively connected to the variable image zone to display information thereon based on the one or more touch inputs.

22 Claims, 20 Drawing Sheets

CIRCUIT BREAKERS

CROSS-REFERENCE TO RELATED APPLICATIONS

This application claims priority to and the benefit of U.S. Provisional Application No. 63/436,452, filed Dec. 30, 2022, the entire contents of which are herein incorporated by reference in their entirety.

FIELD

This disclosure relates to circuit breakers.

BACKGROUND

Physical volume for extra features and functions is a trade-off that circuit breaker designers constantly face. Traditional devices have limited features without adding size in extra pole widths or without utilizing add-on devices that also use extra space inside the panel.

Such conventional methods and systems have generally been considered satisfactory for their intended purpose. However, there is still a need in the art for improvements. The present disclosure provides a solution for this need.

SUMMARY

A circuit breaker can include a housing configured to fit within a slot of a circuit panel and a display configured to display information. The display can include a touch zone configured to allow touch inputs, a variable image zone configured to display trip information, diagnostic information, and/or label information, and a fixed image zone configured to display fixed text that is at least partially coincident with the touch zone.

In certain embodiments, the fixed image zone can be printed text (e.g., behind a glass layer). In certain embodiments, the variable image zone can be a bistable display configured to maintain the displayed image without active power. In certain embodiments, the bistable display can include a landscape text display such that the text is in-line with a long direction of the housing. In certain embodiments, the fixed image zone can include text orthogonal to the bistable display landscape text. In certain embodiments, the fixed image zone can include a "TEST" box coincident with the touch zone. In certain embodiments, the touch zone can be larger than the "TEST" box. In certain embodiments, the touch zone can be coincident with the bistable display and the fixed display zone.

The circuit breaker can include a logic module configured to cause the display to show a label in a normal ON state, test results information in a test state, and trip information in a tripped state. In certain embodiments, the logic module can be configured to cause the circuit information label to display on the display in a mechanical or digitally commanded off state.

The circuit breaker can include a mechanical handle configured to move between an ON position and an OFF position. In certain embodiments, the mechanical handle further includes a trip position between the ON position and the OFF position. In certain embodiments, the mechanical handle can include an "ON" label at a portion thereof that is visible in the ON position. The mechanical handle can be configured to move to cause the "ON" label to be blocked by the housing in the trip state and the OFF position.

In certain embodiments, the circuit breaker can include a trip light disposed on the housing behind the mechanical handle. The mechanical handle can be configured to hide at least a portion of the trip light in the ON position. The mechanical handle can be configured to reveal the trip light in the trip position and the OFF position.

In certain embodiments, the logic module can be configured to control a light state based on a state of the breaker. The logic module can be configured to illuminate the trip light to be solid or blinking in one or more patterns to indicate a trip, test results, or other indicated states to a user and to be off in a normal ON state. In certain embodiments, each of the trip, test results, or other indicated states can include a unique blinking pattern.

The circuit breaker can include an "OFF" label disposed on the housing behind the handle. The mechanical handle can hide the "OFF" label in the ON position and in the trip position. The mechanical handle can reveal the "OFF" label in the OFF position.

In certain embodiments, the logic module can be configured to turn the circuit breaker off in response to a digital command (e.g., a wireless command). In such a scenario, the mechanical handle may not move to the OFF position, and the logic module can be configured to display a digital "OFF" label indicating the breaker is off.

In accordance with at least one aspect of this disclosure, a circuit breaker can include a housing configured to fit within a slot of a circuit panel, a display configured to display information, a logic module, a trip light disposed on the housing, and a mechanical handle configured to move between an ON position and an OFF position. The mechanical handle can be any suitable mechanical handle disclosed herein. The circuit breaker can include any other suitable features as disclosed herein.

In accordance with at least one aspect of this disclosure, a circuit breaker can include a housing configured to fit within a slot of a circuit panel and a display configured to display information. The display can include a touch zone configured to allow touch inputs, and a variable image zone configured to display information and at least partially coincident with the touch zone. The circuit breaker can also include a logic module operatively connected to the touch zone to receive the touch inputs, and operatively connected to the variable image zone to display information thereon based on the one or more touch inputs.

In certain embodiments, the display can include a fixed image zone configured to display fixed text that is at least partially coincident with the touch zone. In certain embodiments, the fixed image zone can be printed text. In certain embodiments, the variable image zone can be a bistable display configured to maintain the displayed image without active power. In certain embodiments, the logic module can be configured to display a selected branch circuit name on the variable image zone.

In certain embodiments, the circuit breaker can be configured to be remote controlled. The logic module can be configured to display a remote control (RC) status label on the variable image zone and define a RC mode touch zone at least partially coincident with the RC status label. In certain embodiments, the logic module can be configured to display an RC status change prompt on the variable image zone if the RC mode touch zone is touched such that a first touch input is received. In certain embodiments, the logic module can be configured to await a second touch input for a set period of time after displaying the RC status change prompt. In certain embodiments, if the second touch input is received before expiration of the set period, the logic module is configured to modify an RC mode of the circuit breaker (e.g., from RC ON to RC OFF, or from RC OFF to RC ON) and to display a new RC status label on the variable image zone indicative of the RC mode. In certain embodiments, if the second touch input is not received by the logic module within the set period of time, the logic module is configured to remove the RC status change prompt, revert the variable image zone to a previous display, and leave the RC mode unchanged.

The logic module can define an RC prompt touch zone at least partially coincident with the RC status change prompt to require the user to touch within the RC prompt touch zone to generate the second touch input. The RC prompt touch zone and the RC status change prompt can be separated from the RC status label such that the RC status label can be visible while the RC status change prompt is displayed and such that the user can touch the RC prompt touch zone to change the RC mode.

In certain embodiments, the circuit breaker can be configured to provide earth leakage protection (GFCI), arc fault protection (AFCI), overload protection, short circuit protection, remote ON/OFF control, remote trip control, and energy monitoring. In certain embodiments, the logic module can be configured to provide diagnostics of each function such that the logic module can be configured to autodisplay information about a trip and a diagnosed reason for the trip. In certain embodiments, the logic module can be configured to display a status of a communications function, display branch circuit information, execute a test routine in response to a manually-operated test button being touched, and provide a commissioning interface for pairing to a wireless communication system.

In certain embodiments, the logic module is configured to be powered irrespective of a position of a set of contacts in the circuit breaker. In certain embodiments, the display is configured to present static information if utility power to the circuit breaker is lost. In certain embodiments, the display can be configured to display in black and white. In certain embodiments, the display can be configured to display in three or more colors. Any suitable type of display with any suitable colors that can present a power-off static display is contemplated herein.

In certain embodiments, the logic module can be configured to modify the display to indicate a trip state or power loss state. In certain embodiments, the logic module can be configured to flip the displayed information upside down, and/or color invert the displayed information to indicate a trip state and/or a power loss state.

In accordance with at least one aspect of this disclosure, a non-transitory computer readable medium, comprising computer executable instruction is configured to cause a computer to execute a method. The method can include receiving a first touch input from a circuit breaker display associated with a status of the circuit breaker, and displaying a status change prompt on the circuit breaker display to indicate a touch zone to receive a second touch input and starting a response timer having a set period. In certain embodiments, if the second touch input is received before expiration of a set period, the logic module is configured to modify a mode of the circuit breaker, and to display a new status label. In certain embodiments, if the second touch input is not received within the set period, the logic module is configured to remove the status change prompt, revert the variable image zone to a previous display, and leave the mode unchanged.

These and other features of the embodiments of the subject disclosure will become more readily apparent to those skilled in the art from the following detailed description taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein.

DETAILED DESCRIPTION

Figure 1:
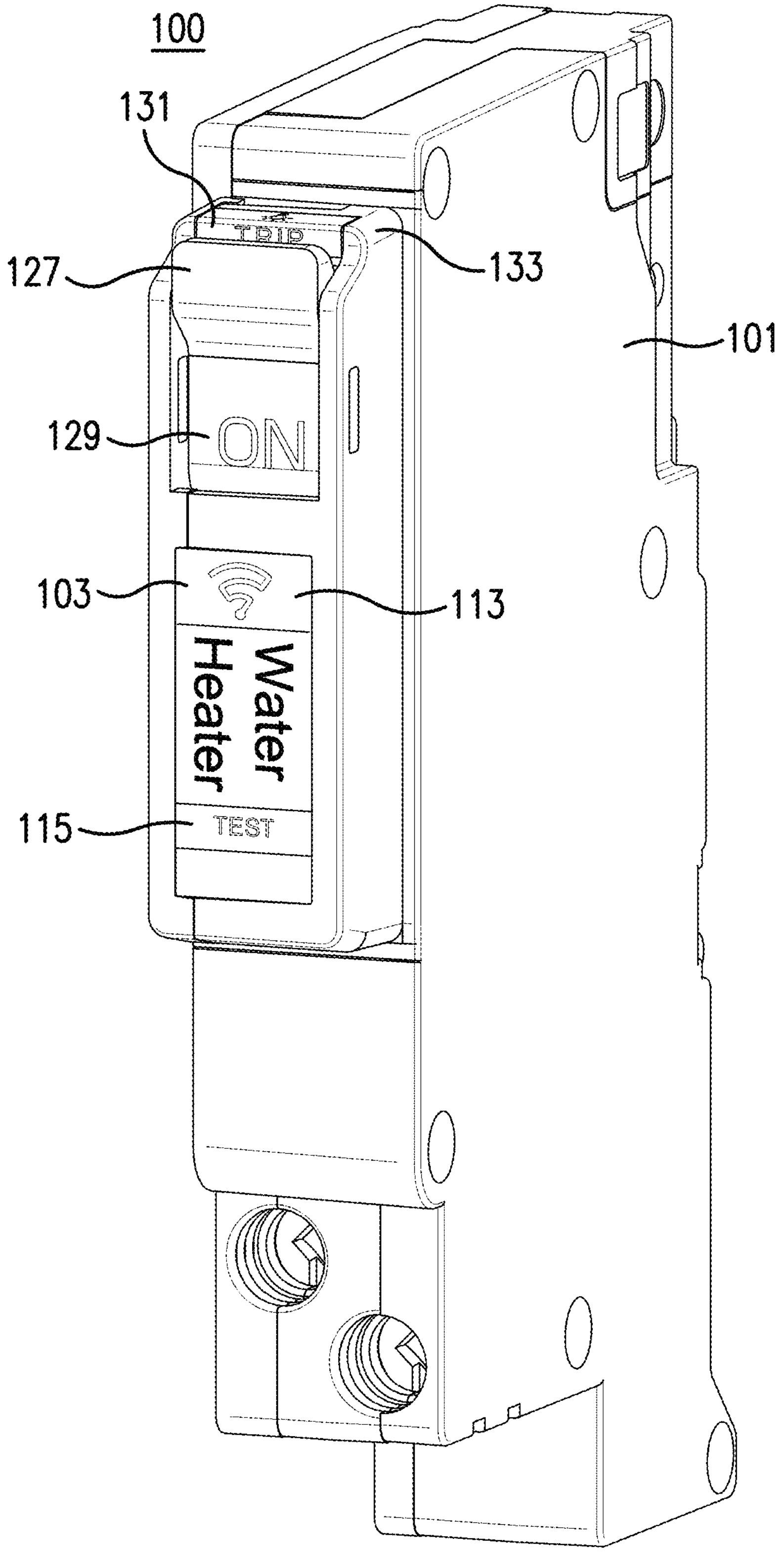
FIG. 1 is a perspective view of an embodiment of a circuit breaker in accordance with this disclosure.

Reference will now be made to the drawings wherein like reference numerals identify similar structural features or aspects of the subject disclosure. For purposes of explanation and illustration, and not limitation, an illustrative view of an embodiment of a circuit breaker in accordance with the disclosure is shown in FIG. 1 and is designated generally by reference character 100. Other embodiments and/or aspects of this disclosure are shown in FIGS. 2-14.

Figure 2:
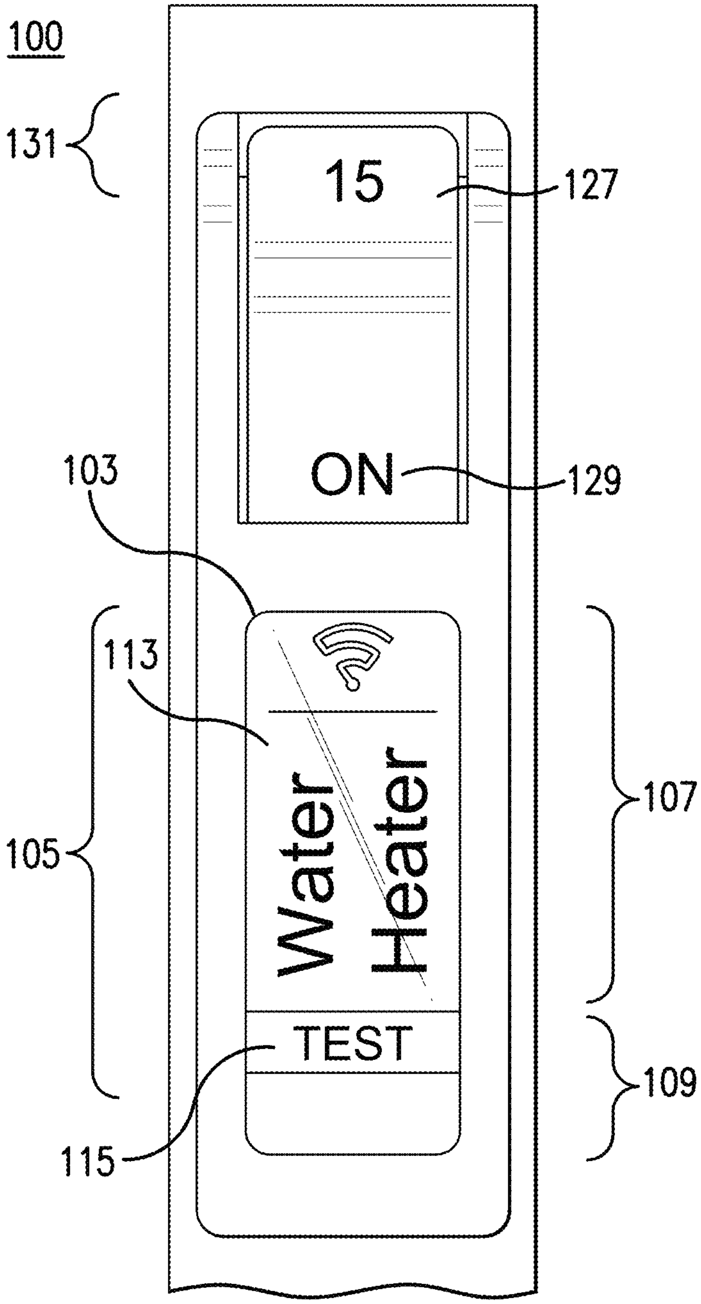
FIG. 2 is a front elevation view of the embodiment of FIG. 1.
Figure 3:
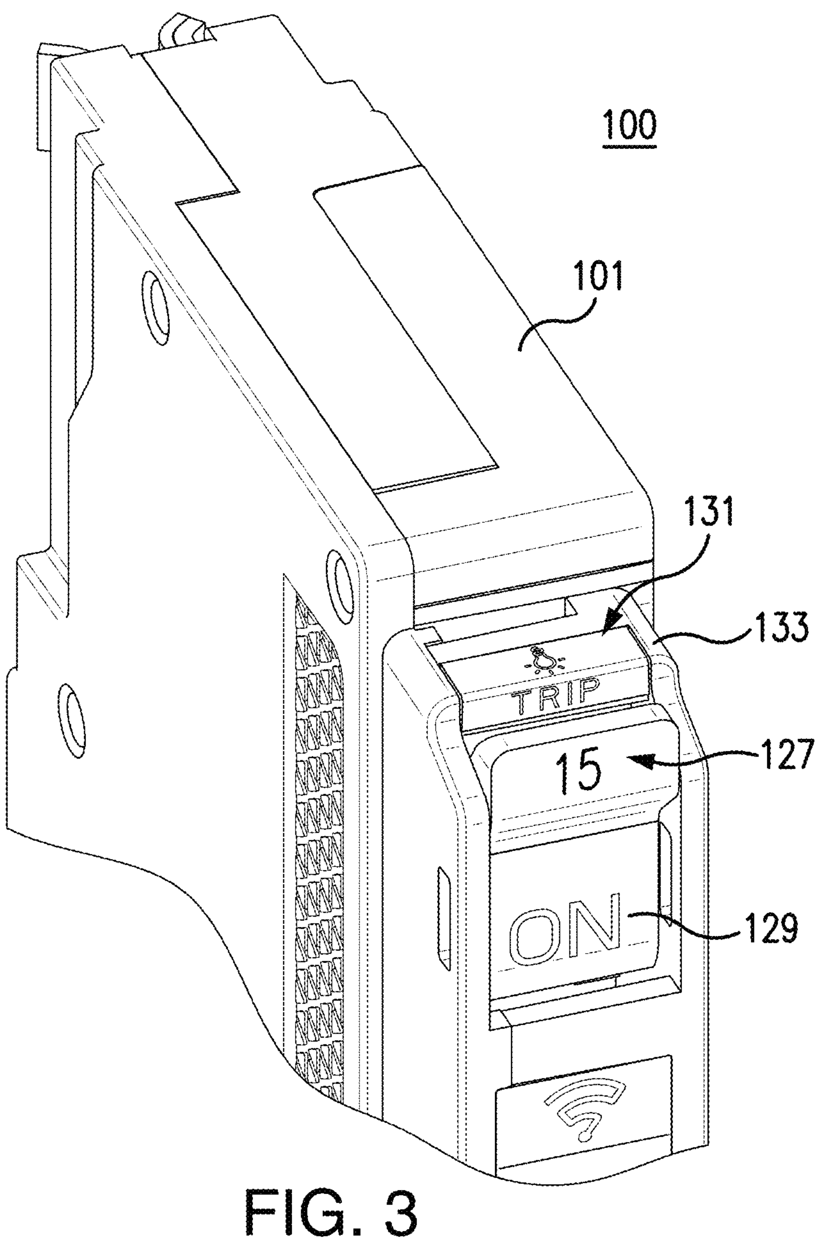
FIG. 3 is a top perspective view of the embodiment of FIG. 1.
Figure 4:
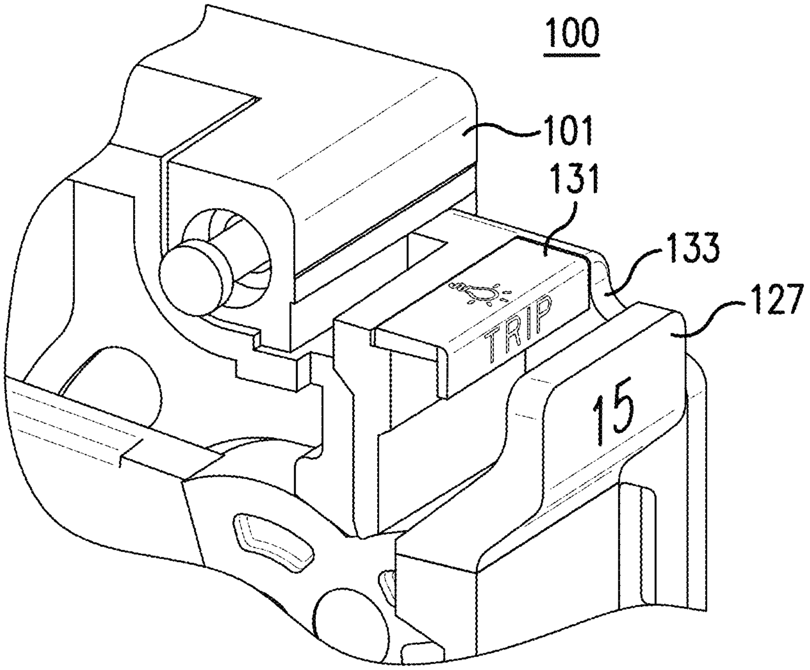
FIG. 4 is a schematic perspective view illustrating an embodiment of a trip light relative to a handle in accordance with this disclosure.
Figure 5:
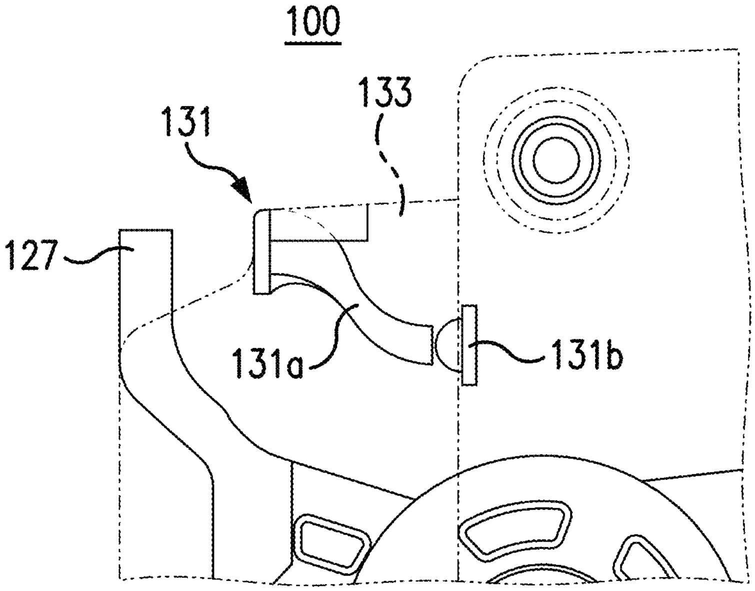
FIG. 5 is a schematic elevation view showing the trip light of FIG. 4 having a light pipe within the housing.
Figure 6:
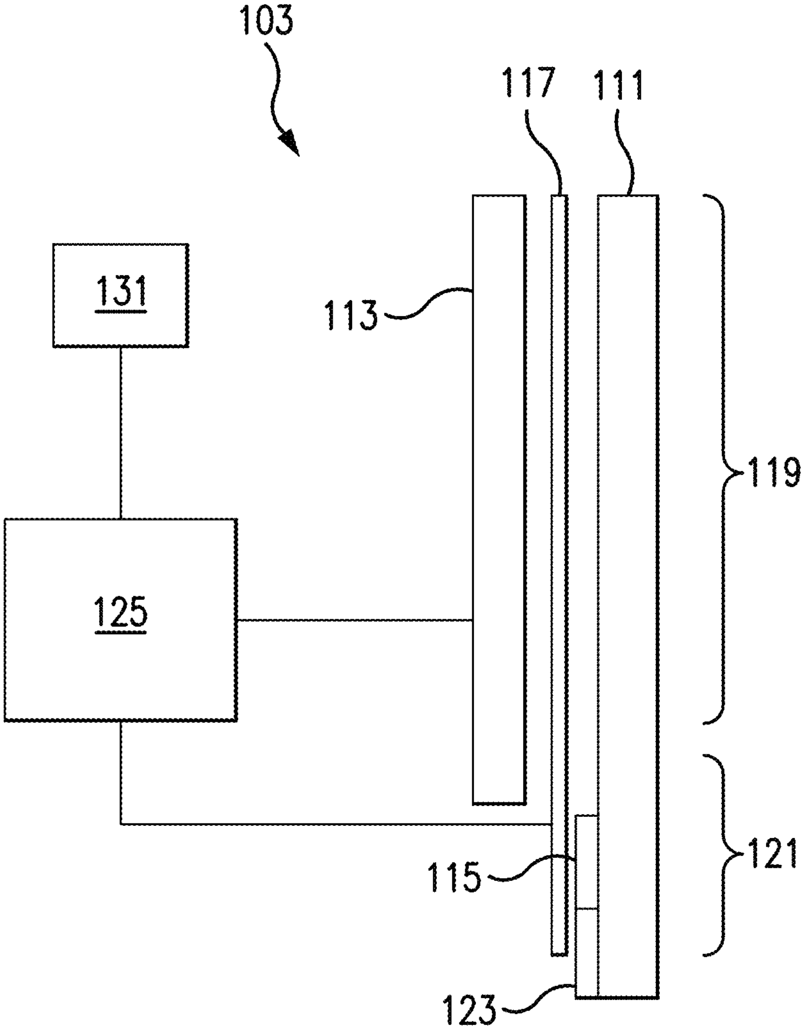
FIG. 6 shows an exploded view of an embodiment of a display in accordance with this disclosure.
Figure 11:
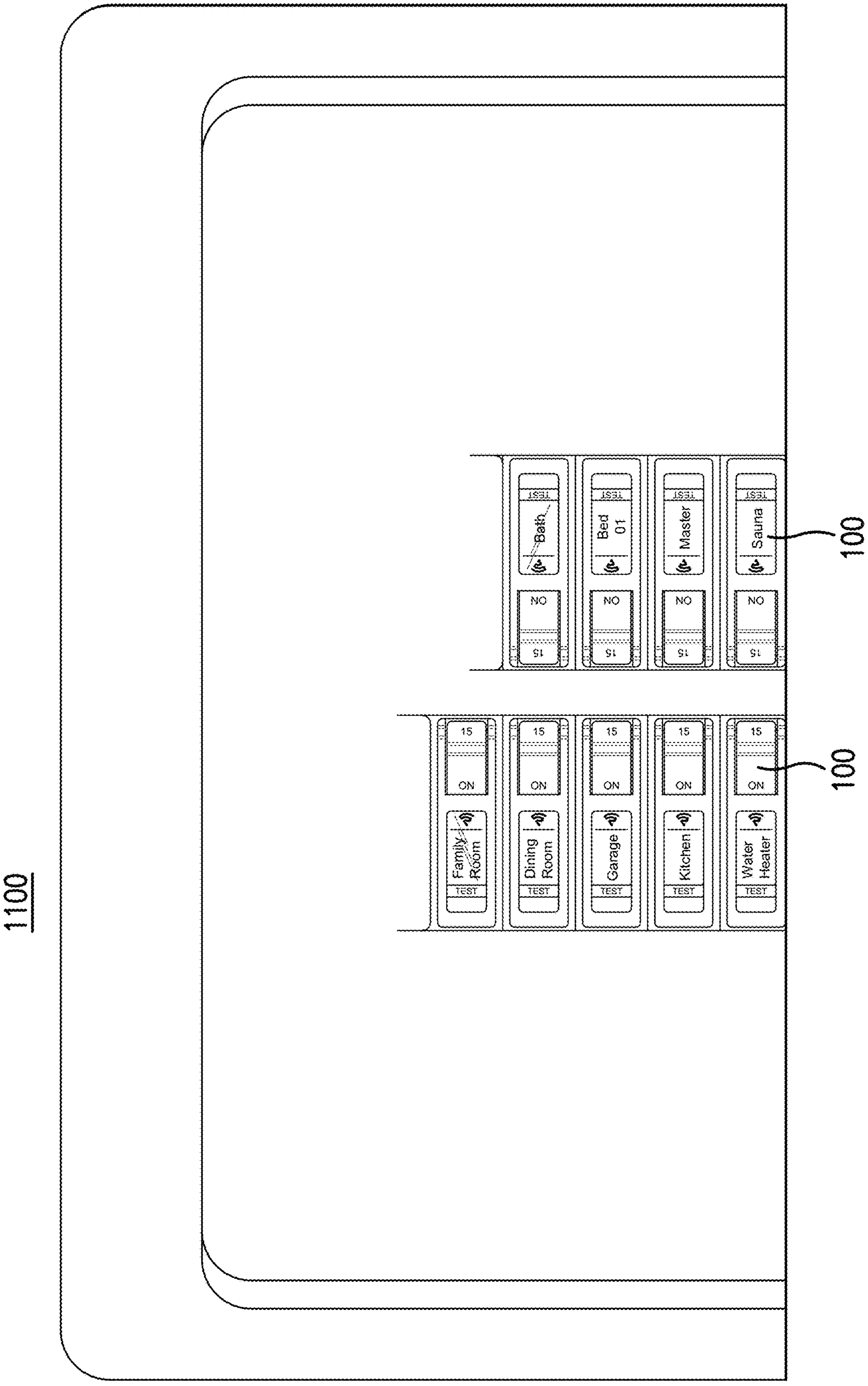
FIG. 11 shows a portion of a circuit breaker panel having a plurality of embodiments of FIG. 1 shown installed therein.

Referring to FIGS. 1-6, a circuit breaker 100 can include a housing 101 configured to fit within a slot of a circuit panel (e.g., as shown in FIG. 11) and a display 103 configured to display information. As shown in FIGS. 2 and 6, the display 103 can include a touch zone 105 (e.g., capacitive or resistive) configured to allow touch inputs, a variable image zone 107 configured to display trip information, status information, and/or label information, and a fixed image zone 109 configured to display fixed text that is at least partially coincident with the touch zone 105.

In certain embodiments, the fixed image zone 109 can be printed text (e.g., behind a glass layer 111). In certain embodiments, the variable image zone 107 can be or include a bistable display 113 configured to maintain the displayed image without active power. In certain embodiments, the bistable display 113 can include a landscape text display such that the text is in-line with a long direction of the housing 101 (e.g., as shown). In certain embodiments, the fixed image zone 109 can include text orthogonal to the bistable display 113 landscape text (e.g., as shown).

In certain embodiments, the fixed image zone 109 can include a "TEST" box 115 coincident with the touch zone 105 configured to initiate a test function when touched. In certain embodiments, the touch zone 105 associated with the "TEST" box 115 can be larger than the "TEST" box 115 (e.g., to provide a wider touch area to initiate a test function). In certain embodiments, the touch zone 105 can be coincident with the bistable display 113 and the fixed display zone 109. For example, as shown in FIG. 6, the bistable display 113 can underlay a capacitive film 117 that defines the touch zone 105. The capacitive film 117 can be longer than the bistable display 113 as shown, and extend under or over the printed "TEST" box 115. The capacitive film 117 can fully encompass the "TEST" box 115 and can extend beyond the "TEST" box 115, e.g., as shown. A layer of glass 111 can overlay all components. As shown, the capacitive film 117 can have a user interface (UI) touch space 119 such that the user can interact with the variable image zone 107, and a test button area 121 which activates a test function when touched. The test button area 121 can be oversized relative to the "TEXT" box 115 such that there is less user error and/or attempts to initiate a test. The test button area 121 may extend to be coincident with other printed markings, e.g., brand marking 123.

Figure 7A:
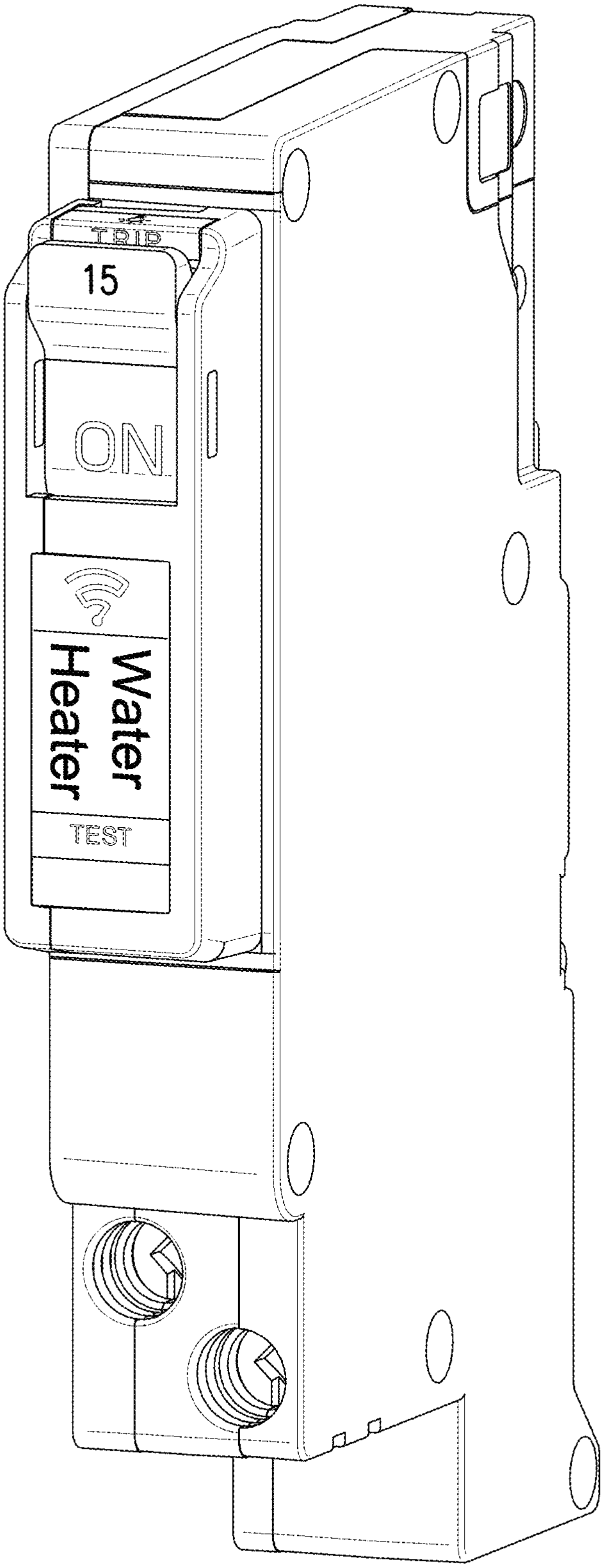
FIG. 7A is a perspective view of the embodiment of FIG. 1, shown in a normal ON state.
Figure 7B:
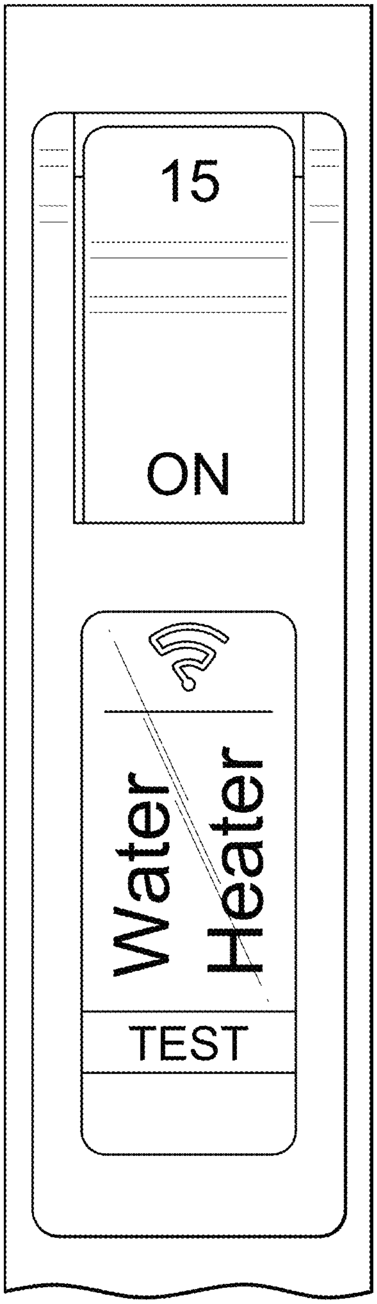
FIG. 7B is an elevation view of the embodiment of FIG. 1, shown in a normal ON state.
Figure 8A:
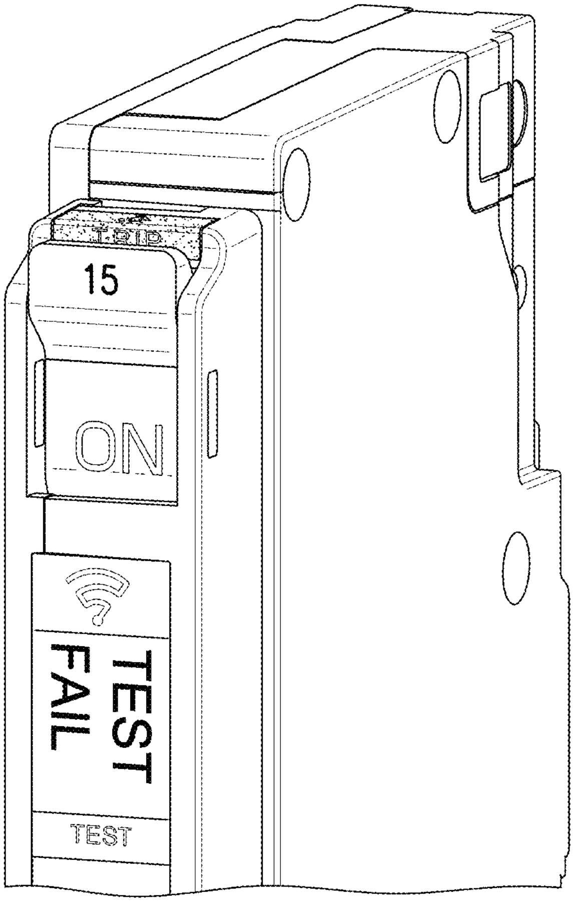
FIG. 8A is a perspective view of the embodiment of FIG. 1, shown in a fail test state, wherein the test light is indicated as on either solid or blinking.
Figure 8B:
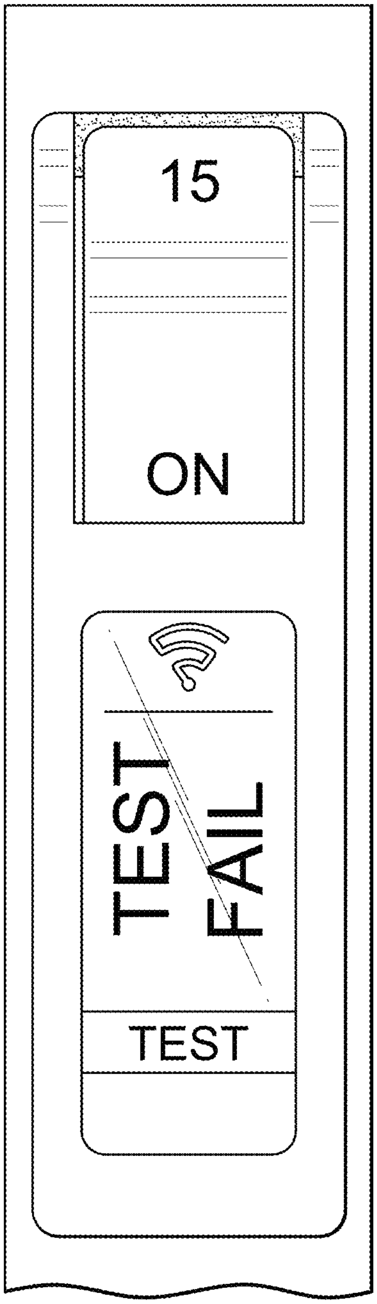
FIG. 8B is an elevation view of the embodiment of FIG. 1, shown in a fail test state.
Figure 9A:
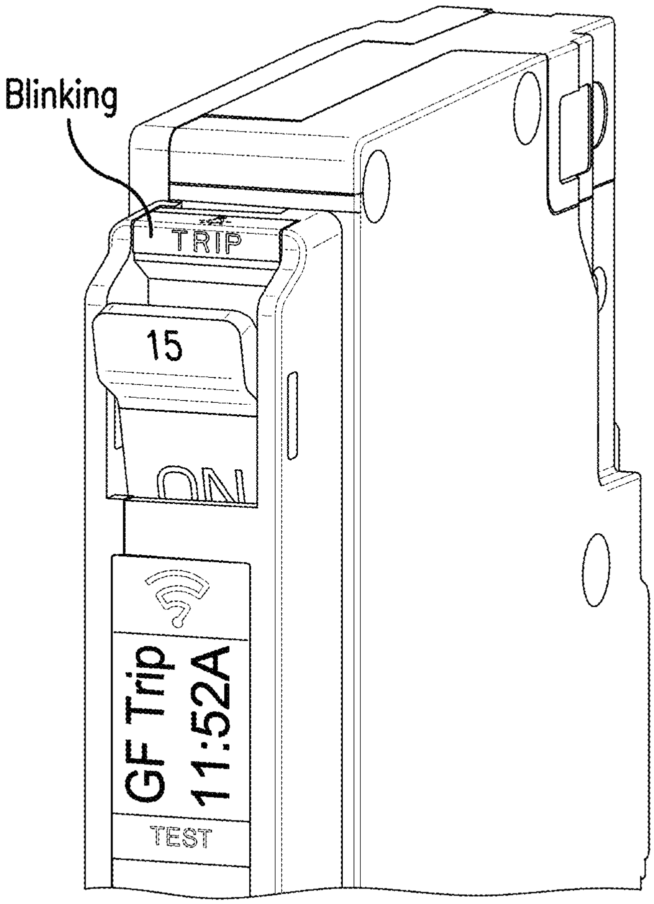
FIG. 9A is a perspective view of the embodiment of FIG. 1, shown in a trip state, wherein the mechanical handle is in a trip position, and the trip light is revealed by the mechanical handle.
Figure 9B:
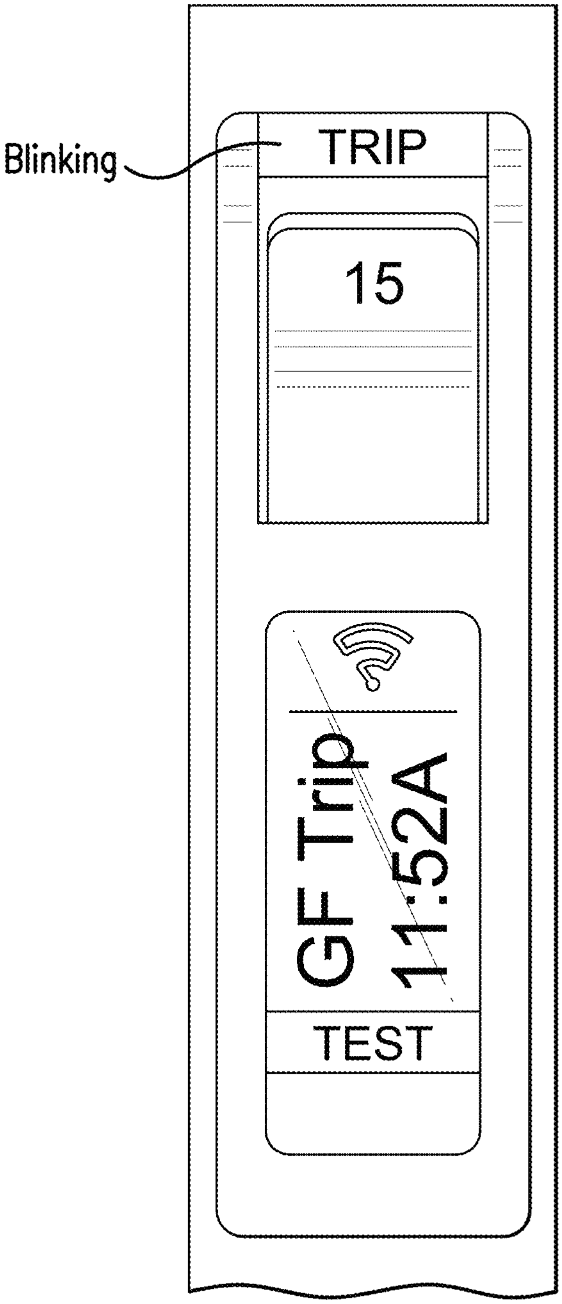
FIG. 9B is an elevation view of the embodiment of FIG. 1, shown in a trip state.
Figure 9C:
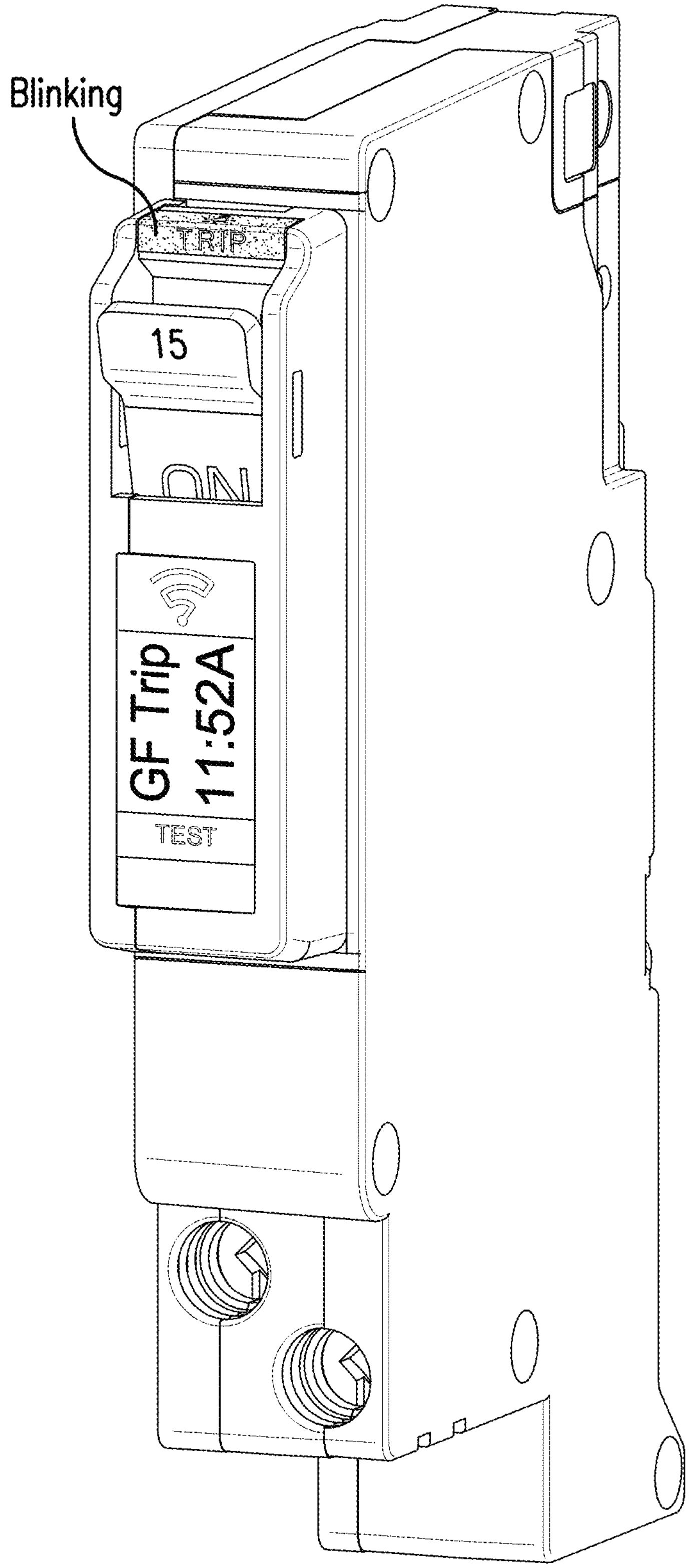
FIG. 9C is a perspective view of the embodiment of FIG. 1, shown in a trip state, wherein the trip light is shown on indicating it is blinking in the trip state.

The circuit breaker 100 can include a logic module 125 configured to cause the display 103 to show a label (e.g., a custom circuit name input by a user) in a normal ON state (e.g., as shown in FIGS. 7A and 7B), test status information in a test state (e.g., as shown in FIGS. 8A and 8B), and trip information in a trip state (e.g., a trip state as shown in FIGS. 9A-9C). In certain embodiments, the logic module 125 can be configured to cause the label to be shown on the display 103 in a mechanical or digitally commanded off state (e.g., as shown in FIGS. 10A-10C).

Figure 10A:
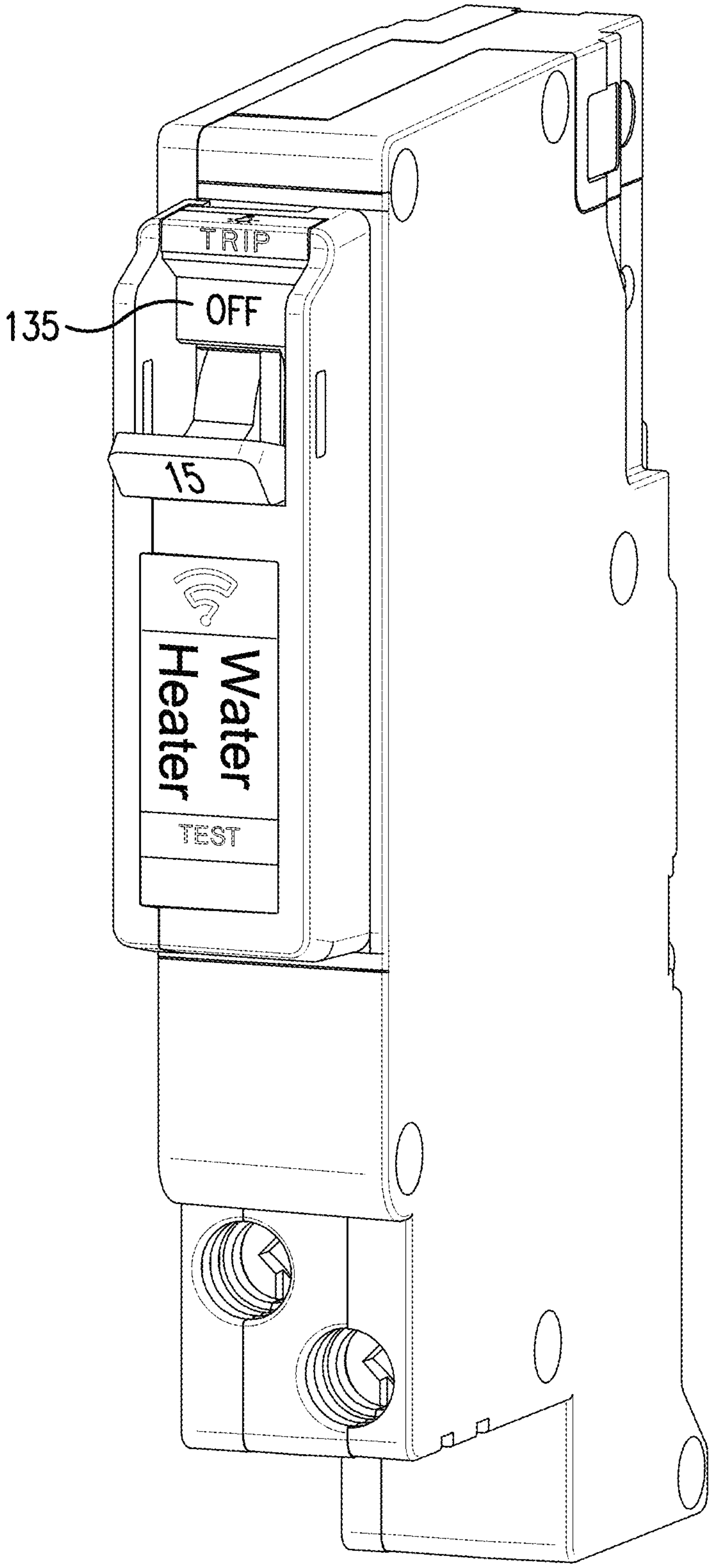
FIG. 10A is a perspective view of the embodiment of FIG. 1, shown in a mechanical OFF state, showing an "OFF" label exposed.
Figure 10B:
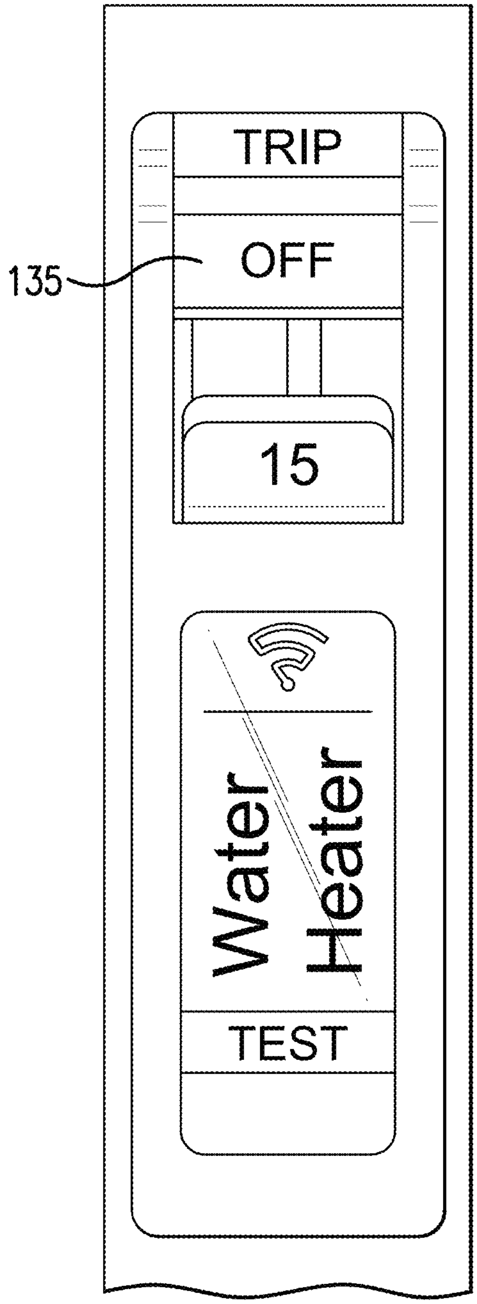
FIG. 10B is an elevation view of the embodiment of FIG. 1, shown in a mechanical OFF state.
Figure 10C:
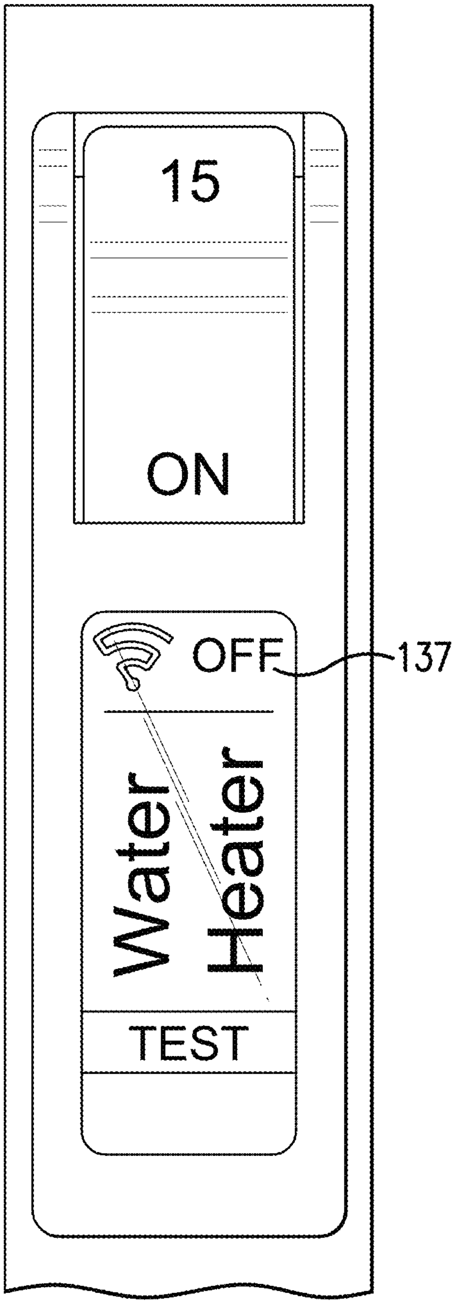
FIG. 10C is an elevation view of the embodiment of FIG. 1, shown in a digital OFF state, wherein the mechanical handle is not moved to the OFF position, and the display indicates the "OFF" label.

The circuit breaker 100 can include a mechanical handle 127 configured to move between an ON position (e.g., as shown in FIGS. 7A and 7B) and an OFF position (e.g., as shown in FIGS. 10A and 10B). The mechanical handle 127 can be configured to mechanically open and close a contactor of the circuit breaker 100. In certain embodiments, the mechanical handle 127 further includes a trip position between the ON position and the OFF position (e.g., as shown in FIGS. 9A-9C). This trip position can be a stable position between the ON position and the OFF position of the mechanical handle 127. In certain embodiments, the mechanical handle 127 can include an "ON" label 129 at a portion thereof that is visible in the ON position. The mechanical handle 127 can be configured to move to cause the "ON" label to be blocked by the housing 101 in the trip state and the OFF position (e.g., as shown in FIGS. 9A-10B).

In certain embodiments, the circuit breaker 100 can include a trip light 131 disposed on the housing 101 behind the mechanical handle 127, e.g., on a shoulder 133 of the housing 101. The mechanical handle 127 can be configured to hide at least a portion of the trip light 131 in the ON position (e.g., as shown in FIGS. 8A and 8B). The mechanical handle 127 can be configured to reveal the trip light 131 in the trip position and the mechanical OFF position (e.g., as shown in FIGS. 9A-10B).

In certain embodiments, the logic module 125 can be configured to control a light state based on a state of the breaker 100. The logic module can be configured to illuminate the trip light 131 to be solid or blinking in one or more patterns to indicate a trip, test status, or other condition to a user and to be off in a normal ON state. In certain embodiments, each of the trip, test status, or other condition can include a unique blinking pattern. For example, a test failure can be indicated by a solid illumination of the trip light 131. A ground fault trip can be indicated by a flashing illumination of the trip light 131 having a first rate of flash and/or a first flash pattern. A different electrical fault type can be indicated by a flashing illumination of the trip light 131 having a second rate of flash and/or a second flash pattern. Any suitable patterns and/or rates of flashing to indicate any number of electrical fault types are contemplated herein.

The circuit breaker 100 can include an "OFF" label 135, e.g., as shown in FIGS. 10A and 10C, disposed on the housing 101 behind the handle 127. The mechanical handle 127 can hide the "OFF" label 135 in the ON position (e.g., as shown in FIGS. 8A and 8B) and in the trip position (e.g., as shown in FIGS. 9A-9C). The mechanical handle 127 can reveal the "OFF" label in the mechanical OFF position, e.g., as shown in FIGS. 10A and 10B.

In certain embodiments, the logic module 125 can be configured to turn the circuit breaker 100 off in response to a digital command (e.g., a wireless command). The breaker 100 can include a motor (not shown) configured to actuate the contactors between the on state and the off state, irrespective of handle position. The logic module 125 can be configured to operate the motor in response to a command and/or in accordance with logic. For example, the logic module 125 can be configured to wirelessly communicate (e.g., via the internet, via a direct connection, and/or via a local wireless system) with another device (e.g., smart device, a computer) to allow control of the breaker 100 with the other device. In such a scenario, the mechanical handle 127 may not move to the OFF position as shown in FIG. 10C, and the logic module 125 can be configured to display a digital "OFF" label 137 indicating the breaker 100 is off.

FIG. 11 shows a portion of a circuit breaker panel 1100 having a plurality of embodiments of FIG. 1 shown installed therein. The panel 1100 can include any suitable number of circuit breakers 100 disclosed herein, and/or any other suitable breaker types.

In accordance with at least one aspect of this disclosure, a circuit breaker (e.g., breaker 100, can include a housing 101 configured to fit within a slot of a circuit panel 1100, a display configured to display information, a logic module 125, a trip light 131 disposed on the housing 101, and a mechanical handle 127 configured to move between an ON position and an OFF position. The mechanical handle 127 can be any suitable mechanical handle 127 disclosed herein. The logic module 125 can be any suitable module 125 disclosed herein. The circuit breaker 100 can include any other suitable features as disclosed herein.

Embodiments can include a trip light 131 moved from below the handle 127 to now above the handle 127 which is hidden by the handle in the ON state. This light can blink in certain trip conditions (e.g., ground fault), for example. Light patterns can be a reliable and/or redundant way to determine an electrical fault type (e.g., in the event the display 103 cannot otherwise display the cause of the trip). Any suitable light patterns are contemplated herein. The trip light can include a light pipe 131*a* that diffuses light from an LED 131*b*, for example.

Embodiments can include a handle that rotates up to cover a trip when on, and can have a mechanical flag for "ON" visible only when rotated up. The handle can be long enough to cover a portion of the trip light, not the whole trip light, in certain embodiments. The handle can be dimensioned to cover the word "TRIP" on the trip light mostly or completely.

Embodiments can include a display with a capacitive touch area behind physical test and logo symbols. The touch area can include an oversized test button area that mismatches with the word "TEST" to provide a wider activation area. Certain text, e.g., "TEST" and a logo can be physically printed and behind glass. The logic module can control what is displayed on the variable image zone and can be configured to process inputs from the capacitive touch area to either allow the user to interface with the device and/or initiate a test function. For example, if the test button is touched/pushed, the logic module can initiate a self-test and trip if the results of the test are positive. In certain embodiments, the logic module can output a positive indication to the display (e.g., the word "PASSED") if there is no detected problem. In this regard, the display can include a dynamic screen with real-time feedback.

Certain embodiments can include a miniature circuit breaker with advanced protection, remote control, communication and touch display in single pole width format and/or other sizes. Physical volume for extra features and functions is a trade-off circuit breaker designers constantly face. Until now, no other device has the ability to do every feature listed in the summary without adding size in extra pole widths or add-on devices that also use extra space inside the panel.

Embodiments can allow all the features to be offered while not using any more circuit spaces inside the electrical panel than traditional thermal magnetic circuit breakers that do not have advanced protection, remote control, communication or a display that can provide rich information. Traditional advanced function circuit breakers add a pole space for added volume to house communication and UI indicator components. Other solutions on the market today can only achieve all the features disclosed herein using an external control device. This adds cost, increases space used inside the panel, and raises the complexity of the system.

Embodiments can include an advanced protection circuit breaker with multiple functions (e.g., arc fault, ground fault, thermal and magnetic) and can add a compact stored energy motor mechanism to open and close the electrical contacts via remote control, a mechanical means to link the remote control mechanism to the traditional primary electrical contacts, a motor control circuit that integrates with the protection, communication, and supervisory circuits in the breaker, a radio transmitter and receiver communication system to connect to the remote control means, an innovative bistable display (e-ink like) that can show local users rich variable dynamic information about breaker status, electrical fault parameters, QR codes, circuit identifiers but also has permanent markings for UL standards testing compliance, a display with two regions of touch function (one to initiate UL standards user test checks and two for the user to interact with the display to get other information and/or to digitally change the state of the breaker to be open or closed), and the software and firmware to execute all the functions of the other elements. Embodiments have components to achieve a function with a minimum number of components and smallest footprint, and all components can work in concert to operate the breaker, interact with the outside connected system, interface with users locally, and meet applicable codes and standards.

Figure 12:
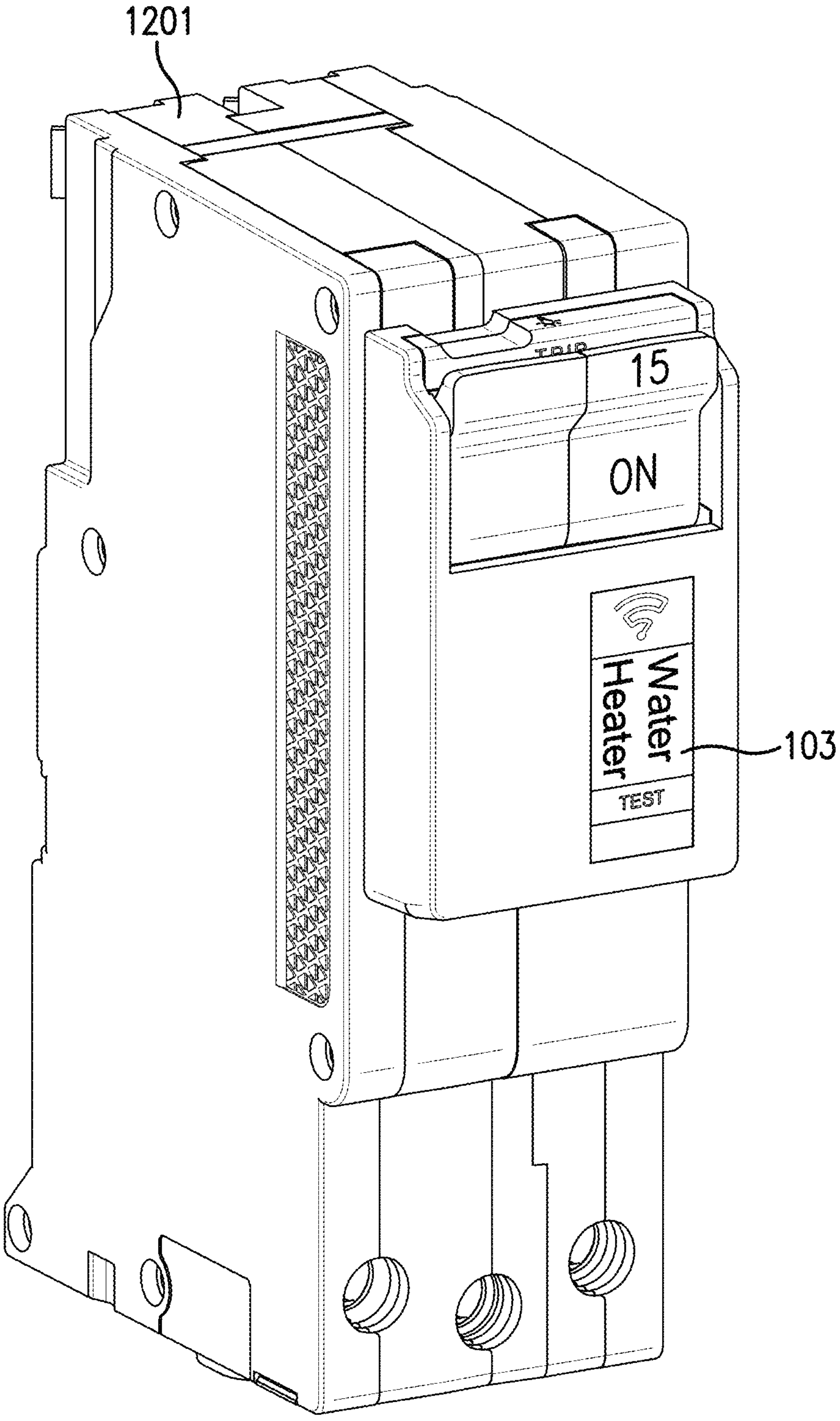
FIG. 12 is a perspective view of another embodiment of a circuit breaker in accordance with this disclosure.
Figure 13A:
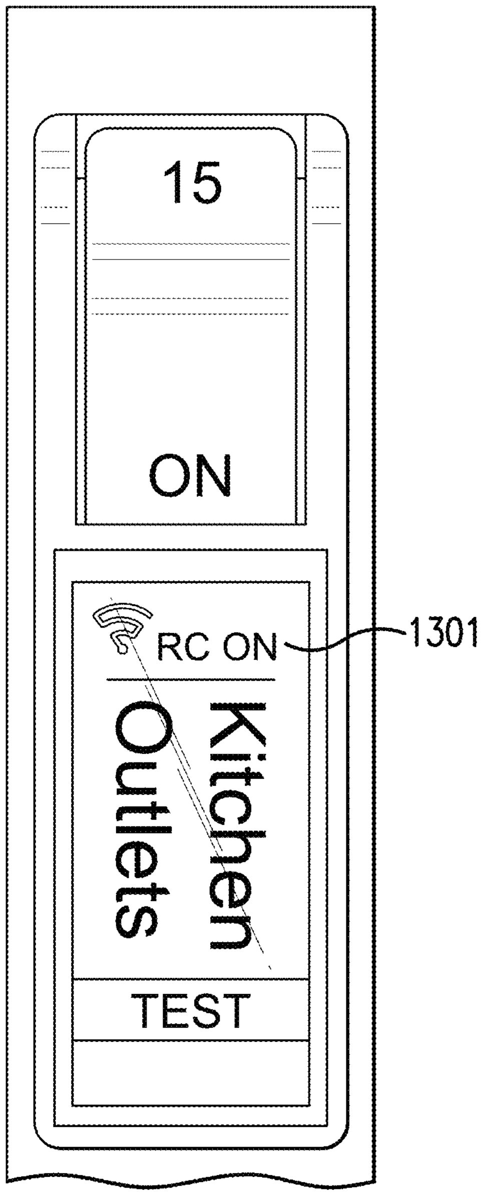
FIG. 13A illustrates an embodiment of information displayed by a logic module in a first state accordance with this disclosure.
Figure 13B:
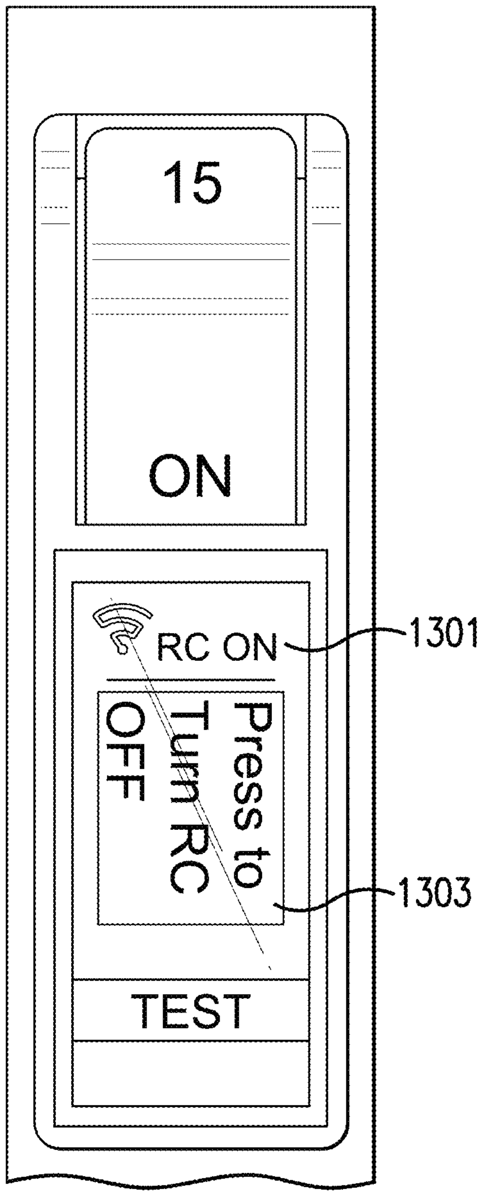
FIG. 13B illustrates an embodiment of information displayed by a logic module in a second state accordance with this disclosure.
Figure 14:
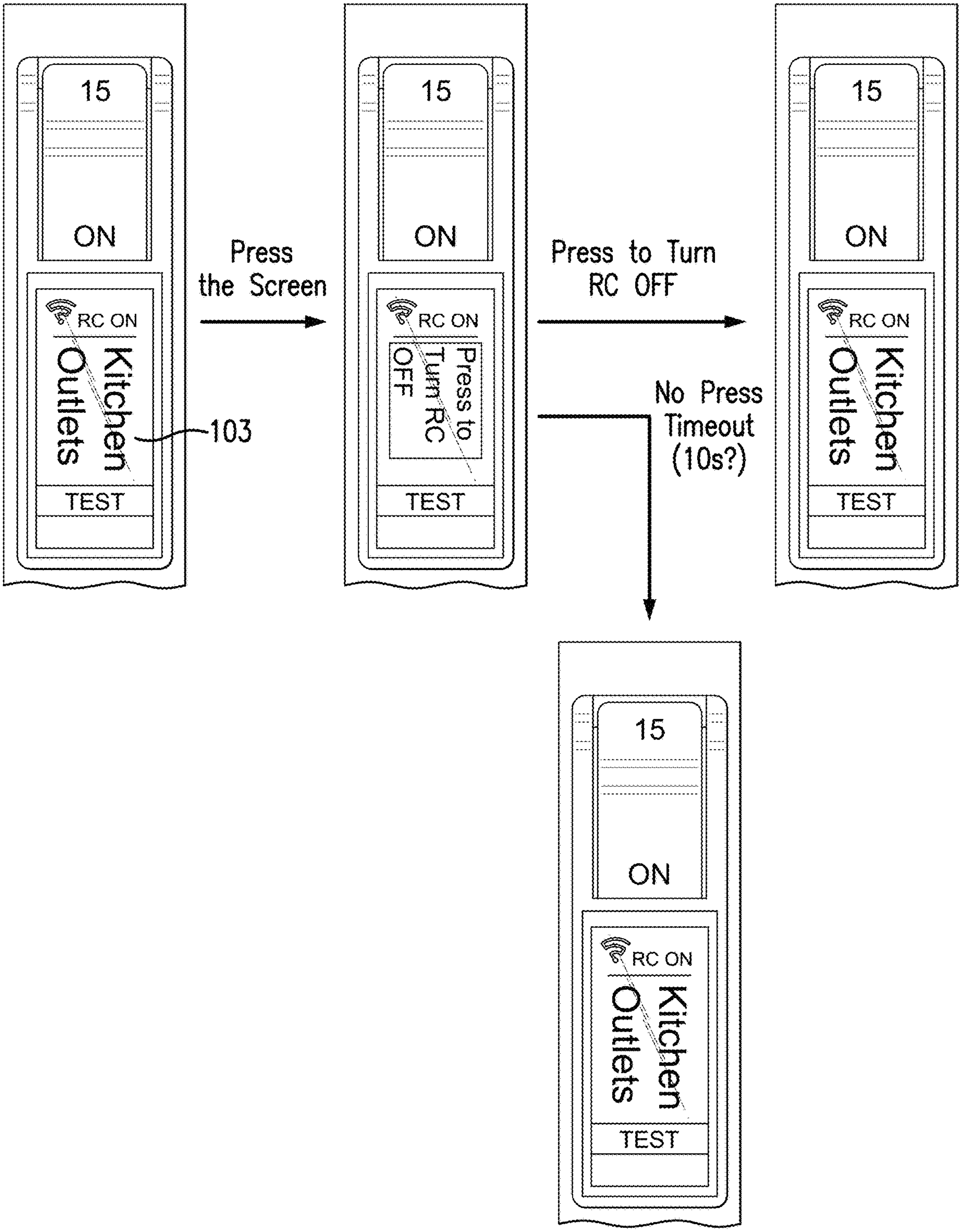
FIG. 14 is an animation illustrating a computer implemented method in accordance with this disclosure.

In accordance with at least on aspect of this disclosure, referring additionally to FIGS. 12-14, a circuit breaker 100, 1200 can include a housing 101, 1201 configured to fit within a slot of a circuit panel 1100 (e.g., circuit breaker 100 in a single pole slot and circuit breaker 1200 in a dual pole slot, or any other suitable construction for any suitable number of multipoles). The circuit breaker 100, 1200 can include a display 103 configured to display information. The circuit breaker 1200 can be similar to the circuit breaker 100 in a dual pole format. Circuit breaker 1200 can have any suitable additional functions.

The display 103 can include a touch zone 105 configured to allow touch inputs, and a variable image zone 107 configured to display information and at least partially (e.g., entirely) coincident with the touch zone 105. The circuit breaker 100, 1200 can also include a logic module 125 operatively connected to the touch zone 105 to receive the touch inputs, and operatively connected to the variable image zone 107 to display information thereon based on the one or more touch inputs.

In certain embodiments, the display 103 can include a fixed image zone 109 configured to display fixed text (e.g., as described above) that is at least partially coincident with the touch zone 105. In certain embodiments, the fixed image zone can be printed text (e.g., as described above). In certain embodiments, the variable image zone 107 can be a bistable display, e.g. similar to an E-ink technology, as disclosed above, configured to maintain the displayed image without active power. In certain embodiments, the logic module 125 can be configured to display a selected branch circuit name on the variable image zone 107 (e.g., as shown: "Water Heater").

In certain embodiments, the circuit breaker 100, 1200 can be configured to be remote controlled (e.g., the logic module 125 can be configured to wirelessly communicate with another device and/or network). The logic module 125 can be configured to display a remote control (RC) status label 1301 on the variable image zone 107, e.g., as shown in FIG. 13A. The logic module 125 can also define an RC mode touch zone (e.g., the area around the text, e.g., up to and/or include the shown underline) at least partially coincident with the RC status label 1301. Any other suitable status for display and an associated defined touch zone is contemplated herein.

Any suitable number of states are contemplated herein, however, the amount of displayed statuses can be limited by the size of the display and/or desired touch zone/text minimum size while still allowing display of branch circuit name text. In certain embodiments, there may be no status displayed initially, and there may be a menu button that causes display of a menu of options for changing one or more states of the circuit breaker. Any logic to navigate to a status change on the display is contemplated herein.

In certain embodiments, as shown in FIG. 13B, the logic module 125 can be configured to display an RC status change prompt 1303 on the variable image zone 107 if the RC mode touch zone is touched such that a first touch input is received. Referring additionally to FIG. 14, in certain embodiments, the logic module 125 can be configured to await a second touch input for a set period of time after displaying the RC status change prompt. In certain embodiments, if the second touch input is received before expiration of the set period, the logic module 125 can be configured to modify an RC mode of the circuit breaker 100, 1200 (e.g., from RC ON to RC OFF, or from RC OFF to RC ON) and to display a new RC status label on the variable image zone 107 indicative of the RC mode. In certain embodiments, if the second touch input is not received by the logic module 125 within the set period of time, the logic module 125 can be configured to remove the RC status change prompt 1303, revert the variable image zone 107 to a previous display, and leave the RC mode unchanged. This process and/or logic can be utilized for any suitable state change accessible via the display 103.

The logic module 125 can define an RC prompt touch zone at least partially coincident with the RC status change prompt 1303 (entirely coincident) to require the user to touch within the RC prompt touch zone (e.g., within the RC status change prompt 1303) to generate the second touch input (e.g., that the logic module 125 accepts as confirmatory to change the state). The RC prompt touch zone and the RC status change prompt 1303 can be separated from the RC status label 1301 (e.g., as shown) such that the RC status label 1301 can be visible while the RC status change prompt 1303 is displayed and such that the user can or must touch the RC prompt touch zone in order to change the RC mode.

In certain embodiments, the circuit breaker can be configured to provide earth leakage protection (GFCI), arc fault protection (AFCI), overload protection, short circuit protection, remote ON/OFF control, remote trip control, and energy monitoring. In certain embodiments, the logic module 125 can be configured to provide diagnostics of each function such that the logic module 125 can be configured to auto-display information about a trip and a diagnosed reason for the trip. In certain embodiments, the logic module 125 can be configured to display a status of a communications function (e.g., a wireless symbol as shown when connected wirelessly), display branch circuit information (e.g., a name of the branch), execute a test routine in response to a manually-operated test button being touched (e.g., as disclosed above), and provide a commissioning interface for pairing to a wireless communication system (e.g., one or more prompts and/or menus that allows a user to configure wireless settings and/or to put the device into a pairing mode).

In certain embodiments, the logic module 125 is configured to be powered irrespective of a position of a contactor in the circuit breaker 100, 1200. In this regard, the logic module 125 and the display 103 can be powered as long as there is utility power. In certain embodiments, the display 103 is configured to present static information if utility power to the circuit breaker 100, 1200 is lost. In certain embodiments, the display 103 can be configured to display in black and white, e.g., as shown. In certain embodiments, the display 103 can be configured to display in three or more colors. Any suitable type of display (e.g., bistable, multistable) with any suitable colors that can present a power-off static display is contemplated herein.

In certain embodiments, the logic module 125 can be configured to modify the display 103 to indicate a trip/fault state or power loss state. In certain embodiments, the logic module 125 can be configured to flip the displayed information upside down, and/or color invert the displayed information to indicate a trip/fault state and/or a power loss state. For example, if utility power is lost, the logic module 125 can invert the display colors as a last update prior to shutting down. Any suitable visual change in response to any suitable fault or other issue is contemplated herein.

In certain embodiments, the logic module 125 can be configured such that the displayed image or text can be rotated to match the orientation of the circuit breaker. For example, if the circuit breaker is mounted on the right side of the panel, the text or images can be inverted relative to the circuit breakers mounted on the left side of the panel such that the image or text displayed will be right side up. In certain embodiments, the logic module 125 can use data from an accelerometer to determine the orientation of the circuit breaker after installation. In certain embodiments, the orientation of the text can be manually set by a user using one or more controls (e.g., buttons, digital prompts, menus, etc.).

In accordance with at least one aspect of this disclosure, a non-transitory computer readable medium, comprising computer executable instruction configured to cause a computer to execute a method. The method can include receiving a first touch input from a circuit breaker display associated with a status of the circuit breaker, and displaying a status change prompt on the circuit breaker display to indicate a touch zone to receive a second touch input and starting a response timer having a set period. In certain embodiments, if the second touch input is received before expiration of a set period, the logic module is configured to modify a mode of the circuit breaker, and to display a new status label indicating the new mode. In certain embodiments, if the second touch input is not received within the set period, the logic module is configured to remove the status change prompt, revert the variable image zone to a previous display, and leave the mode unchanged.

Embodiments can include, an advanced function circuit breaker with a touch-screen display. Embodiments can provide any and/or all of arc fault protection (AFCI), earth leakage protection (GFCI), overload protection, short circuit protection, remote ON/OFF control, remote trip, and/or energy monitoring. Embodiments can include a touch-screen display through which there can be local control of the remote ON/OFF function, status of the remote ON/OFF function, diagnostics and status of the advanced protection functions, reporting of trip events, status of the communications function, branch circuit information, manually-operated supervisory test button, and a commissioning interface (e.g., for pairing for zigbee system, for example).

Embodiments can include any suitable touch buttons, for example, a touch screen display with multiple touch buttons allowing user interface with the advanced circuit breaker. The touch buttons can be touch sensitive without the use of dedicated mechanical contacts. The touch buttons can use a capacitive or resistive touch sensitive technology. The touch button interface can also enable a manually operated supervisory test. The touch button interface can also enable the commissioning of the advanced circuit breaker into a wireless communications system.

Embodiments can include a display allowing advanced function circuit breaker information to be presented to the user. The display can provide branch circuit information communications status, ON/OFF control status, trip events, and/or advanced function diagnostics for example. The display can have the capability to continue to display information after a trip event or when the circuit breaker is OFF. The display can have the capability to continue to be read after power is completely removed from the line side of the circuit breaker (e.g., using e-ink technology for example). The display can be black and white or any combination of colors. The display can include permanent markings positioned next to the variable image zone. Some markings can be portrait orientation, and some can be landscape orientation (e.g., as shown).

Embodiments can include a touch screen display with indication of the status of the remote ON/OFF function. The touch screen can have the capability to accept a touch from the user to enter a mode that allows the state of the remote ON/OFF function to be changed. In certain embodiments, the display can have a second soft-touch button that accepts a touch input to change the RC state, for example. For example, in certain embodiments, pressing the specific button to change the state allows the ON/OFF state to change. Any combinations of display screens and soft buttons to accomplish the same task accomplished above is contemplated herein. Embodiments can allow the ON/OFF control to be turned ON from the OFF state and OFF from the ON state, for example.

Embodiments can include a touch sensitive button serving as the manually operated supervisory test button for an advanced function circuit breaker. The touch sensitive button can use a capacitive touch sensor technology, for example. The capacitive touch sensor can be integrated into a user interface that includes a display. The test button portion of the user interface having a permanently printed area labeled “TEST” that is not part of the variable display. The capacitive touch test button can be connected to circuitry inside the advanced function circuit breaker to provide a signal to start the manually operated supervisory test function when the TEST area is touched.

Embodiments can allow for variable circuit information to be displayed (e.g., self-labeling, custom labeling) on the circuit breaker. This can avoid the need for panel labels. Embodiments thus can include an advanced function circuit breaker with an integral display for the purpose of displaying the label of the connected branch circuit. The display can use a bistable technology with the ability to continue to present the static branch circuit information (e.g., the label) if power is lost at the line side of the circuit breaker. Embodiments can also change how the label is displayed (e.g., color appearance, orientation, etc.) when there is a reported event (e.g., trip, power loss, test status, etc.). The branch circuit label can be entered through an app (e.g., on a connected smart device) associated with the device during the system commissioning process, for example. Any other suitable method to modify the branch circuit label is contemplated herein.

Embodiments can include any suitable computer hardware and/or software module(s) to perform any suitable function (e.g., as disclosed herein). As will be appreciated by those skilled in the art, aspects of the present disclosure may be embodied as a system, method or computer program product. Accordingly, aspects of this disclosure may take the form of an entirely hardware embodiment, an entirely software embodiment (including firmware, resident software, micro-code, etc.), or an embodiment combining software and hardware aspects, all possibilities of which can be referred to herein as a “circuit,” “module,” or “system.” A “circuit,” “module,” or “system” can include one or more portions of one or more separate physical hardware and/or software components that can together perform the disclosed function of the “circuit,” “module,” or “system”, or a “circuit,” “module,” or “system” can be a single self-contained unit (e.g., of hardware and/or software). Furthermore, aspects of this disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of this disclosure may be written in any combination of one or more programming languages, including an object oriented programming language such as Java, Smalltalk, C++ or the like and conventional procedural programming languages, such as the “C” programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of this disclosure may be described above with reference to flowchart illustrations and/or block diagrams of methods, apparatus (systems) and computer program products according to embodiments of this disclosure. It will be understood that each block of any flowchart illustrations and/or block diagrams, and combinations of blocks in any flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in any flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified herein.

Those having ordinary skill in the art understand that any numerical values disclosed herein can be exact values or can be values within a range. Further, any terms of approximation (e.g., "about", "approximately", "around") used in this disclosure can mean the stated value within a range. For example, in certain embodiments, the range can be within (plus or minus) 20%, or within 10%, or within 5%, or within 2%, or within any other suitable percentage or number as appreciated by those having ordinary skill in the art (e.g., for known tolerance limits or error ranges).

The articles "a", "an", and "the" as used herein and in the appended claims are used herein to refer to one or to more than one (i.e., to at least one) of the grammatical object of the article unless the context clearly indicates otherwise. By way of example, "an element" means one element or more than one element.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of."

Any suitable combination(s) of any disclosed embodiments and/or any suitable portion(s) thereof are contemplated herein as appreciated by those having ordinary skill in the art in view of this disclosure.

The embodiments of the present disclosure, as described above and shown in the drawings, provide for improvement in the art to which they pertain. While the subject disclosure includes reference to certain embodiments, those skilled in the art will readily appreciate that changes and/or modifications may be made thereto without departing from the spirit and scope of the subject disclosure.

What is claimed is:

1. A circuit breaker, comprising:

a housing configured to fit within a slot of a circuit panel;

a display configured to display information, wherein the display includes:

a touch zone configured to allow one or more touch inputs; and a variable image zone configured to display information, wherein a portion of the variable image zone is beneath the touch zone to at least be partially coincident with the touch zone; and a logic module operatively connected to the touch zone to receive the one or more touch inputs, and operatively connected to the variable image zone to display the information thereon based on the one or more touch inputs.

2. The circuit breaker of claim 1, wherein the display includes a fixed image zone configured to display fixed text that is at least partially coincident with the touch zone.

3. The circuit breaker of claim 2, wherein the fixed image zone is printed text.

4. The circuit breaker of claim 1, wherein the variable image zone is a bistable display configured to maintain a displayed image without active power.

5. The circuit breaker of claim 1, wherein the logic module is configured to display a selected branch circuit name on the variable image zone.

6. The circuit breaker of claim 1, wherein the display is a touch screen display.

7. A circuit breaker comprising:

a housing configured to fit within a slot of a circuit panel;

a display configured to display information, wherein the display includes:

a touch zone configured to allow one or more touch inputs; and a variable image zone configured to display information and at least be partially coincident with the touch zone; and a logic module operatively connected to the touch zone to receive the one or more touch inputs, and operatively connected to the variable image zone to display the information thereon based on the one or more touch inputs, wherein the logic module is configured to display a selected branch circuit name on the variable image zone, wherein the circuit breaker is configured to be remote controlled, and wherein the logic module is configured to display a remote control (RC) status label on the variable image zone and define a RC mode touch zone at least partially coincident with the RC status label.

8. The circuit breaker of claim 7, wherein the logic module is configured to display an RC status change prompt on the variable image zone if the RC mode touch zone is touched such that a first touch input is received.

9. The circuit breaker of claim 8, wherein the logic module is configured to await a second touch input for a set period of time after displaying the RC status change prompt, wherein if the second touch input is received before expiration of the set period, the logic module is configured to modify an RC mode of the circuit breaker from RC ON to RC OFF, or from RC OFF to RC ON, and to display a new RC status label on the variable image zone indicative of the RC mode.

10. The circuit breaker of claim 9, wherein if the second touch input is not received by the logic module within the set period of time, the logic module is configured to remove the RC status change prompt, revert the variable image zone to a previous display, and leave the RC mode unchanged.

11. The circuit breaker of claim 10, wherein the logic module defines an RC prompt touch zone at least partially coincident with the RC status change prompt to require a user to touch within the RC prompt touch zone to generate the second touch input.

12. The circuit breaker of claim 11, wherein the RC prompt touch zone and the RC status change prompt are separated from the RC status label such that the RC status label is visible while the RC status change prompt is displayed and such that the user touches the RC prompt touch zone to change the RC mode.

13. The circuit breaker of claim 12, wherein the circuit breaker is configured to provide earth leakage protection (GFCI), arc fault protection (AFCI), overload protection, short circuit protection, remote ON/OFF control, remote trip control, and energy monitoring.

14. The circuit breaker of claim 13, wherein the logic module is configured to provide diagnostics of each function such that the logic module is configured to auto-display information about a trip and a diagnosed reason for the trip.

15. The circuit breaker of claim 14, wherein the logic module is configured to display a status of a communications function, display branch circuit information, execute a test routine in response to a manually-operated test button being touched, and provide a commissioning interface for pairing to a wireless communication system.

16. The circuit breaker of claim 15, wherein the logic module is configured to be powered irrespective of a position of a set of main electrical contacts within the circuit breaker.

17. The circuit breaker of claim 16, wherein the display is configured to present static information if utility power to the circuit breaker is lost.

18. The circuit breaker of claim 17, wherein the display is configured to display in two or more colors.

19. The circuit breaker of claim 17, wherein the logic module is configured to modify the display to indicate a trip state or power loss state.

20. The circuit breaker of claim 19, wherein the logic module is configured to flip the displayed information upside down, and/or color invert the displayed information to indicate a trip state and/or a power loss state.

21. A non-transitory computer readable medium, comprising processor executable instructions configured to cause at least one processor of a circuit breaker to execute a method, the method comprising:

receiving a first touch input from a touch zone of a circuit breaker display, the circuit breaker display associated with a status of the circuit breaker; and displaying a status change prompt on a variable image zone of the circuit breaker display to indicate the touch zone is configured to receive a second touch input and starting a response timer having a set period, wherein if the second touch input is received before expiration of a set period, the at least one processor is configured to modify a mode of the circuit breaker to a new mode, and to display a new status label indicating the new mode, wherein a portion of the variable image zone is beneath the touch zone.

22. The non-transitory computer readable medium of claim 21, wherein if the second touch input is not received within the set period, the at least one processor is configured to remove status change prompt, revert the variable image zone to a previous display, and leave the mode unchanged.

* * * * *